United States Patent [19]
Ahern et al.

[11] Patent Number: 5,163,405
[45] Date of Patent: Nov. 17, 1992

[54] KNOCK CONTROL BY REDUCTION OF INJECTION PERIOD

[75] Inventors: Steven R. Ahern, Claremont; Claudio Pracilio, Balcatta, both of Australia

[73] Assignee: Orbital Engine Company (Australia) Pty. Ltd., Australia

[21] Appl. No.: 776,297

[22] PCT Filed: Jun. 29, 1990

[86] PCT No.: PCT/AU90/00277

§ 371 Date: Dec. 6, 1991

§ 102(e) Date: Dec. 6, 1991

[87] PCT Pub. No.: WO91/00420

PCT Pub. Date: Jan. 10, 1991

[51] Int. Cl.$^5$ .................... F02D 41/14; F02D 41/34
[52] U.S. Cl. ..................................... 123/435; 123/531
[58] Field of Search ...................... 123/435, 531, 533

[56] References Cited
FOREIGN PATENT DOCUMENTS

20264/88 2/1989 Australia .
3022993 1/1982 Fed. Rep. of Germany ...... 123/435
60-135642 7/1985 Japan .

OTHER PUBLICATIONS

Translation of cited passage at p. 307 of a Taiwanese text "Internal Combustion Engines" (translation provided).

*Primary Examiner*—Tony M. Argenbright
*Attorney, Agent, or Firm*—Nikaido, Marmelstein, Murray & Oram

[57] ABSTRACT

A method of operating an internal combustion engine to control "knock" therein, by injecting a metered quantity of fuel entrained in a gas directly onto the engine combustion chamber and controlling the timing of injection of the fuel into the combustion chamber. The control of timing of injection being effected by setting the time of the end of the period of injection in relation to the engine cycle, and reducing the duration of the injection period in response to detection of "knock" in the engine above a predetermined level. The duration of injection is reduced in a stepwise manner one step each cycle until "knock" is eliminated or reduced below the predetermined level.

6 Claims, No Drawings

KNOCK CONTROL BY REDUCTION OF INJECTION PERIOD

This invention relates to the controlling of the operation of an internal combustion engine and in particular to taking corrective action upon the occurrence of "knock" arising from detonation rather than controlled combustion of part of the fuel/air mixture.

"Knock" is a well-known problem in the operation of internal combustion engines and is a particular problem when an engine is subjected to transient high load conditions. It is known to provide engines with a "knock" sensor, usually in the form of a vibration sensor, to either issue an appropriate warning to the engine operator or to activate an appropriate automatic corrective procedure. Known corrective procedures are usually to either retard the ignition timing of the engine, or to increase the fuelling rate of the engine. Controlling the level of "knock" by retarding ignition timing and/or the use of an increasing fuelling rate resulting in a rich mixture may lead to problems in emissions control or power output.

It is the object of the present invention to provide a system for controlling "knock" in internal combustion engines which will provide an effective response to the detection of "knock" to control same, and has a relatively minor influence on emission levels in the engine exhaust.

With this object in view, there is provided according to the present invention, a method of operating an internal combustion engine to control "knock" therein, comprising injecting a metered quantity of fuel entrained in a gas directly into the engine combustion chamber, controlling the timing of injection by setting the time of the end of the period of injection in relation to the engine cycle, and reducing the duration of the injection period in response to detection of "knock". in the engine above a predetermined level.

Preferably upon detection of "knock" above said predetermined level, the duration of injection is reduced by a preset initial amount, and thereafter if "knock" persists, by a preset additional amount, or several thereof, until "knock" ceases or the detected level falls below said predetermined level. Normally the preset initial amount of reduction of the duration of injection is greater than the subsequent preset additional amounts. Thus, upon the detection of "knock" above the predetermined level, there will be an initial reduction in the duration of injection, that initial amount being preset to achieve a cessation of "knock" under normal circumstances, and one or more preset additional amounts of adjustment are required only under severe "knock" conditions.

Conveniently, after "knock" has ceased as a result of a reduction in the duration of injection, that duration is increased at a predetermined rate to its normal level preferably in a step-wise manner so that there will not be a sudden variation in the injection period, which can in some circumstances, re-initiate "knock" in the engine.

As is common practice, both ignition timing and injection timing are set on the basis of degrees of rotation of the crankshaft prior to the top dead centre (TDC) position of the piston of the particular cylinder. The duration of the period of injection can be similarly measured in degrees of angle of rotation of the crankshaft or on a time base. The present proposal to decrease the duration of the period of injection is based on the timing of the completion of injection be set on an angle of rotation prior to TDC and the duration of injection being real time based measured forward from the injection completion timing.

As is known, "knock" or detonation of the fuel commonly initiates in areas of minimal clearance between the piston and the wall of the combustion chamber, usually the cylinder head, and such areas of minimum clearance are normally located around the perimeter of the principal combustion area. The present invention by reducing the period of injection from a set completion timing, hence reducing the time period between commencement of injection and commencement of ignition results in less time for the fuel to travel to those areas of high compression where detonation is likely to occur and thus the likelihood of detonation is reduced. The fuelling level may remain substantially at a normal level as determined by the engine load.

In one embodiment of the invention, upon detection of a "knock" level above a predetermined value, an ECU, used to control the injection timing and other functions of the engine, reduces the duration of injection by 0.5 millisecond for the next engine cycle. Thus injection will be completed at the same point in the engine cycle, but will be of a duration 0.5 millisecond shorter. If the ECU continues to detect the occurrence of "knock" at an unacceptable level, the duration of injection will be reduced by a further 0.5 millisecond. Under normal circumstances, a reduction of the injection period by a total of 1 millisecond is sufficient to eliminate or at least reduce "knock" to an acceptable level. However, if after the 1 millisecond reduction in injection duration, the "knock" level is still above the permissible level, further progressive reductions of the injection period by 0.5 millisecond per reduction or possible a 0.25 millisecond reduction, are effected. In extremely severe "knock" conditions alternative action may be taken, such as ignition retard, to bring the "knock" to an acceptable level either alone or in combination with injection period reductions.

After each reduction in the duration of the injection period, the ECU will check as to the level of "knock" and, as indicated above, if the level is still above that acceptable, further reductions will be made in the injection period. However, if as a result of the check the ECU determines that the "knock" level is acceptable, it will then increase the injection period by steps of say 0 25 millisecond per cycle, with a check being made on the "knock" level after each adjustment step. This stepwise increase of the injection period is continued until the injection period is returned to the normal duration.

The above example of the "knock" control sequence is typical for an engine having an injection period of the order of 5 milliseconds duration, however, the same sequence of steps is carried out irrespective of the actual normal injection period.

The level of "knock" at which corrective action would commence to be taken may vary from engine to engine. In the case of a "knock" detector selected to measure amplitude of the signal at certain frequency, the measurement may typically be of a 200 Hz width at 13 kHz frequency. If the signal output from the detector, that is the voltage, exceeds a predetermined level corresponding to an acceptable "knock" level, then corrective action is initiated. On the next measurement, the same predetermined threshold may be again utilised to determine if further or less correction is required.

Alternatively, other convenient forms of equivalent "knock" detections may be be used, such as a detector that measures the audible level relative to known acceptable audible level at a certain frequency.

We claim:

1. A method of operating an internal combustion engine to control knock therein, comprising injecting a metered quantity of fuel entrained in a gas directly into the engine combustion chamber, controlling the timing of injection by setting the time of the end of the period of injection in relation to the engine cycle, and reducing the duration of the injection period in response to detection of knock in the engine above a predetermined level.

2. A method of operating an internal combustion engine as claimed in claim 1, wherein the duration of the injection period is reduced a preset amount upon initial detection of knock above said predetermined level, and thereafter progressively further reducing said injection period in response to detection of the continuance of knock above said predetermined level.

3. A method of operating an internal combustion engine as claimed in claim 1, wherein the injection period is initially reduced by 0.5 to 0.25 millisecond upon initial detection of knock above said predetermined level.

4. A method of operating an internal combustion engine as claimed in claim 1, wherein the total reduction in the duration of injection in any one series of reductions is not more than 50% of the duration of injection under non-knock occurring conditions.

5. A method of operating an internal combustion engine as claimed in claim 1, wherein when knock falls below said predetermined level, following a single or series of reductions in the duration of injection, the duration of injection is increased at a predetermined rate to the normal duration.

6. A method of operating an internal combustion engine as claimed in claim 5, wherein said increase in the duration of injection is effected in a stepwise manner.

* * * * *